United States Patent
Rose et al.

(10) Patent No.: US 8,817,463 B1
(45) Date of Patent: Aug. 26, 2014

(54) ELECTRONICS RACK WITH A MOVABLE POWER DISTRIBUTION UNIT

(71) Applicant: LinkedIn Corporation, Mountain View, CA (US)

(72) Inventors: Jacob R. Rose, San Jose, CA (US); Dale B. Clark, Mountain View, CA (US)

(73) Assignee: LinkedIN Corporation, Mountain View, CA (US)

( * ) Notice: Subject to any disclaimer, the term of this patent is extended or adjusted under 35 U.S.C. 154(b) by 0 days.

(21) Appl. No.: 14/015,447

(22) Filed: Aug. 30, 2013

Related U.S. Application Data (60) Provisional application No. 61/856,332, filed on Jul. 19, 2013.

(51) Int. Cl.
*G06F 1/16* (2006.01)

(52) U.S. Cl.
USPC .......... 361/679.45; 361/825; 361/679.02; 361/679.37; 361/679.39; 361/679.4; 361/826; 174/500; 312/334.4; 312/334.5

(58) Field of Classification Search
CPC . H05K 7/1457; H05K 7/1482; H05K 7/1488; H05K 7/1491–7/1494; H05K 7/18; G06F 1/189
USPC .......... 361/727, 724, 679.01, 679.02, 679.37, 361/379.39, 679.4, 679.44, 679.45, 829, 361/826, 825, 636, 659; 174/500; 312/334.4–334.5; 248/229.12
See application file for complete search history.

(56) References Cited

U.S. PATENT DOCUMENTS

| | | | | |
|---|---|---|---|---|
| 6,826,036 | B2 * | 11/2004 | Pereira | 361/624 |
| 7,123,485 | B1 * | 10/2006 | Henderson | 361/724 |
| 7,637,773 | B2 * | 12/2009 | Shifris et al. | 439/540.1 |
| 8,416,565 | B1 * | 4/2013 | Ross | 361/679.43 |
| 2001/0026436 | A1 * | 10/2001 | Tanzer et al. | 361/610 |
| 2006/0215300 | A1 * | 9/2006 | Starr et al. | 360/69 |
| 2007/0159775 | A1 * | 7/2007 | Ewing et al. | 361/642 |
| 2008/0062655 | A1 * | 3/2008 | Laursen et al. | 361/733 |
| 2008/0093927 | A1 * | 4/2008 | Ewing et al. | 307/23 |
| 2009/0014614 | A1 * | 1/2009 | Warmoth et al. | 248/309.1 |
| 2012/0069514 | A1 * | 3/2012 | Ross | 361/679.33 |
| 2012/0162883 | A1 * | 6/2012 | Jai | 361/679.02 |
| 2012/0162910 | A1 * | 6/2012 | Jai | 361/679.58 |

* cited by examiner

*Primary Examiner* — Adrian S Wilson
*Assistant Examiner* — Abhishek Rathod
(74) *Attorney, Agent, or Firm* — Park, Vaughan, Fleming & Dowler LLP (57) ABSTRACT

The disclosed embodiments relate to a rack for housing electronic components with a movable power distribution unit (PDU). The rack includes a rack housing configured to accommodate a plurality of electronic components. It also includes a first PDU configured to supply electrical power to the plurality of electronic components. The rack additionally includes an attachment mechanism configured to movably attach the first PDU to the rack housing, so that the first PDU can be moved to create an access space to facilitate a maintenance operation while the first PDU continues to supply power to the plurality of electronic components.

17 Claims, 6 Drawing Sheets

ELECTRONICS RACK WITH A MOVABLE POWER DISTRIBUTION UNIT

RELATED APPLICATION

This application claims priority under 35 U.S.C. §119 to U.S. Provisional Application No. 61/856,332, entitled "Electronics Rack with a Moveable Power Distribution Unit" by Jacob R. Rose, filed 19 Jul. 2013, the contents of which are herein incorporated by reference in their entirety.

BACKGROUND

1. Field

The disclosed embodiments relate to the design of an electronics rack for housing electronic components, such as server blades, storage devices, or network switches. More specifically, the disclosed embodiments relate to the design of an electronics rack with a movable power distribution unit (PDU), which can be moved to create an access space to service other components in the electronics rack.

2. Related Art

Perhaps the most significant development on the Internet in recent years has been the rapid proliferation of online social networks, such as LinkedIn® and Facebook®. Billions of users are presently accessing such social networks to connect with friends and acquaintances and to share personal and professional information. In order to handle this large volume of traffic, these online social networks are increasingly relying on enterprise computer systems to run their websites. A failure of one of these enterprise computing systems can be disastrous, potentially resulting in millions of dollars in lost revenue. More importantly, a failure can undermine user satisfaction, making users less likely to access a particular online social network. Hence, it is critically important to ensure high availability of such enterprise computing systems.

These enterprise computer systems are typically mounted in racks housed in data centers. To ensure continuous functioning of the enterprise computer systems, each rack typically includes multiple power distribution units (PDUs) that supply power to the electronic components in the rack. In this way, when one of the PDUs fails, the electronic components will continue to receive power from another PDU in the rack.

However, replacing a failed PDU can be pose problems. Note that space is at a premium inside a rack, so the multiple PDUs are typically located in close proximity to each other. Unfortunately, this close proximity and the large number of power cables that connect the PDUs to the electronic components in a rack often makes it impossible to replace a failed PDU without powering down the entire rack.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Rack Structure

Figure 1:
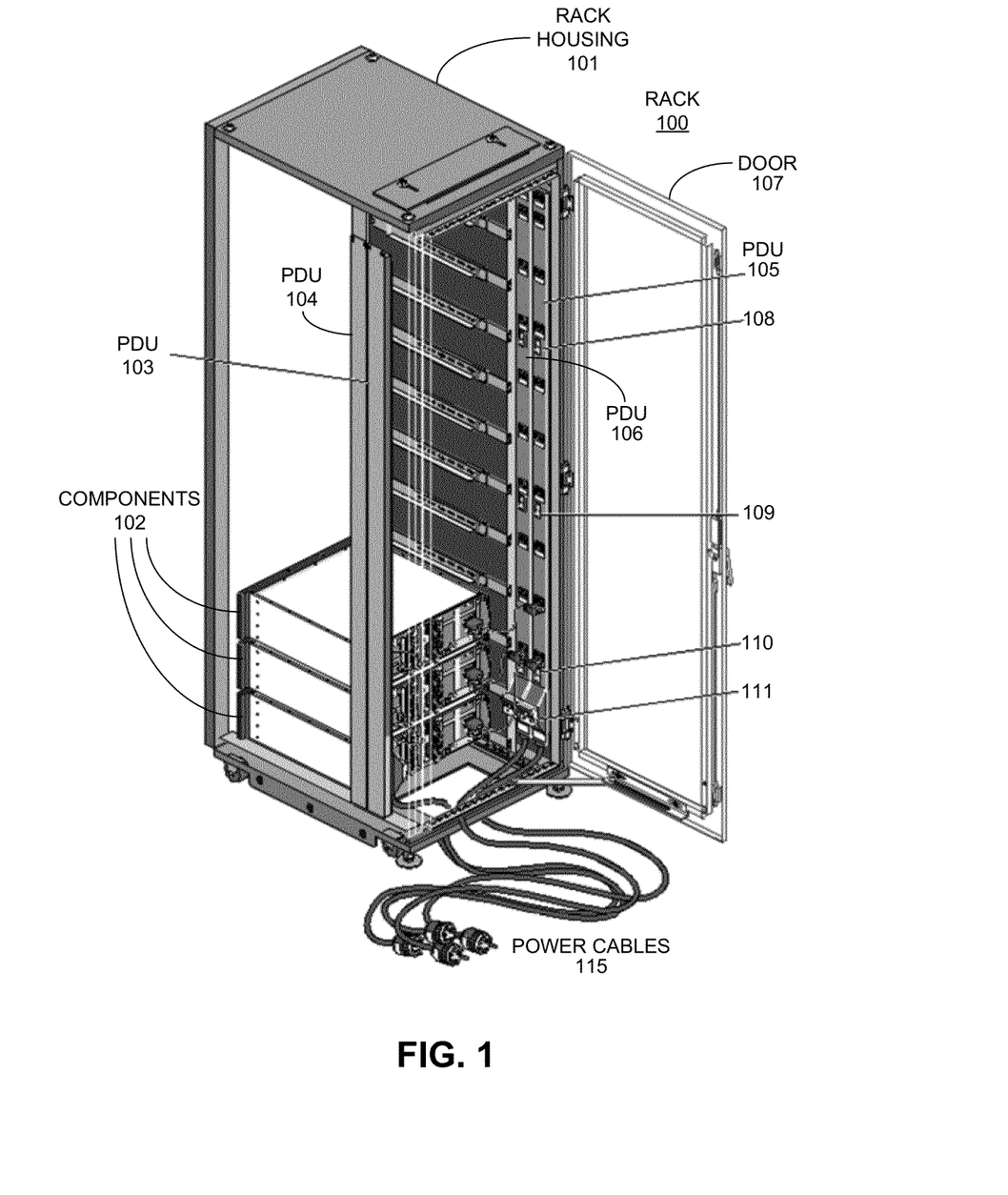
FIG. 1 illustrates a rack for housing electronic components in accordance with the disclosed embodiments.

FIG. 1 illustrates the structure of an exemplary rack 100, which is configured to house electronic components in accordance with the disclosed embodiments. As illustrated in FIG. 1, rack 100 includes a rack housing 101, which is configured to accommodate a number of electronic components 102, such as server blades. In general, rack 100 can house any type of electronic component, including but not limited to: server blades; networking components; storage devices; and telecommunications components.

Rack housing 101 includes a door 107, which can be opened to provide access to the connectors for the electronic components. These connectors provide power and other types of connections for the electronic components, such as network connections and connections between the electronic components in the rack.

Rack 100 also includes a number of PDUs 103-106, including two PDUs 103-104 located on the left-hand side of rack housing 101 and two PDUs 105-106 located on the right-hand side of rack housing 101. Although the exemplary rack 100 illustrated in FIG. 1 includes four PDUs 103-106, in other embodiments, rack 100 includes only two PDUs 103-104, and the other PDUs 105-106 can be replaced with communication lines or other circuitry.

As illustrated in FIG. 1, a given PDU 105 includes a number of black electrical outlets for supplying power to the plurality of computer system components, and also includes circuit breakers 108-111 for the electrical outlets.

Note that PDUs 103-106 connect to external power through power cables 115 that pass through an opening in the bottom of rack housing 101. In an alternative embodiment, power cables 115 connect to external power through an opening in the top of rack housing 101.

Movable PDU

Figure 2A:
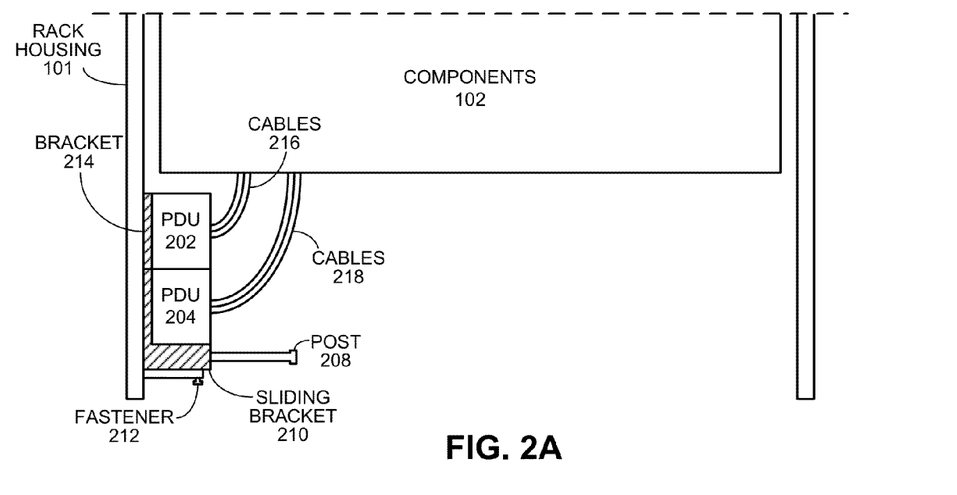
FIG. 2A illustrates a rack that contains two PDUs including an inner PDU and an outer PDU in accordance with the disclosed embodiments.
Figure 2B:
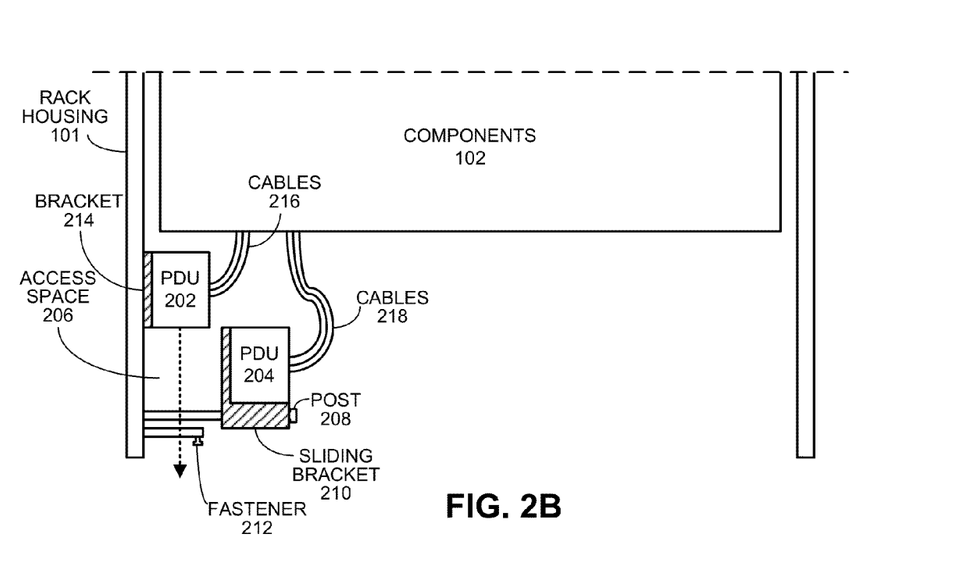
FIG. 2B illustrates how the outer PDU can be moved to facilitate replacing the inner PDU in accordance with the disclosed embodiments.

FIGS. 2A and 2B illustrate a moveable PDU in accordance with the disclosed embodiments. More specifically, FIG. 2A illustrates a top-down view of the inside of rack housing 101. Note that rack housing 101 contains two PDUs, including an inner PDU 202, which is connected to components 102 through a first set of power cables 216, and an outer PDU 204, which is connected to components 102 through a second set of power cables 218.

Note that PDUs 202 and 204 are connected to rack housing 101 in different ways. In particular, inner PDU 202 is connected to a fixed bracket 214 which is affixed to rack housing 101. In contrast, outer PDU 204 is connected to a sliding bracket 210, which is slidably mounted to a post 208 (also referred to as a "rail") that is affixed to rack housing 101. (Note that sliding bracket 210 is mounted on two posts 208, one of which is connected to the top of sliding bracket 210, and the other of which is connected to the bottom of sliding bracket 210.)

When sliding bracket 210 is located in a normal-operating position as illustrated in FIG. 2A, a fastener 212 can be used to lock sliding bracket 210 so that sliding bracket 210 does not move along post 208.

Note that if outer PDU 204 fails, outer PDU 204 can be easily replaced without having to power down the electronic components 102 within rack 100 because other system components do not obstruct the replacement. For example, replacing outer PDU 204 can involve the following operations. First, external power is removed from outer PDU 204 and cables 218 are disconnected from outer PDU 204. Next, outer PDU 204 is replaced with a new outer PDU 204 and the cables 218 are connected to the new outer PDU 204. Finally, external power is connected to the new outer PDU 204.

In contrast, when inner PDU 202 fails, inner PDU 202 is harder to replace because outer PDU 204 and its associated power cables 218 are in the way. Fortunately, sliding bracket 210 enables outer PDU 204 to be moved to facilitate replacing inner PDU 202 as is illustrated in FIG. 2B. More specifically, when inner PDU 202 fails, inner PDU 202 can be replaced by performing the following operations. First, external power is removed from inner PDU 202. Next, cables 216 are disconnected from inner PDU 202. Then, fastener 212 is unhitched and sliding bracket 210 is moved to the end of post 208. This creates an access space 206. Inner PDU 202 is then replaced with a new inner PDU 202 through access space 206. Finally, cables 216 are connected to the new inner PDU 202 before external power is connected to the new inner PDU 202.

Note that if outer PDU 204 were not movable, it would be necessary to remove outer PDU 204 (and to disconnect associated cables 218) to replace a failed inner PDU 202. Moreover, removing outer PDU 204 and disconnecting cables 218 requires the entire rack 100 to be powered down, which can cause problems if critical applications are running in rack 100.

Sliding Bracket

Figure 3A:
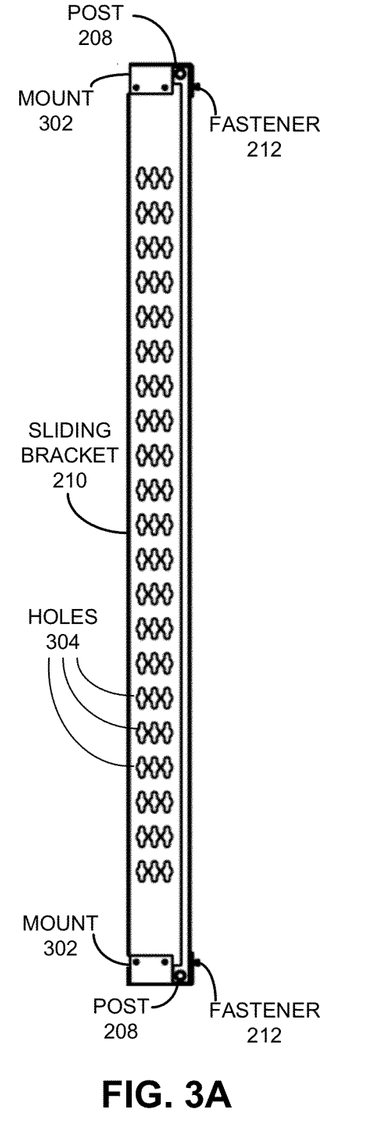
FIG. 3A presents a frontal view of a sliding bracket in accordance with the disclosed embodiments.
Figure 3B:
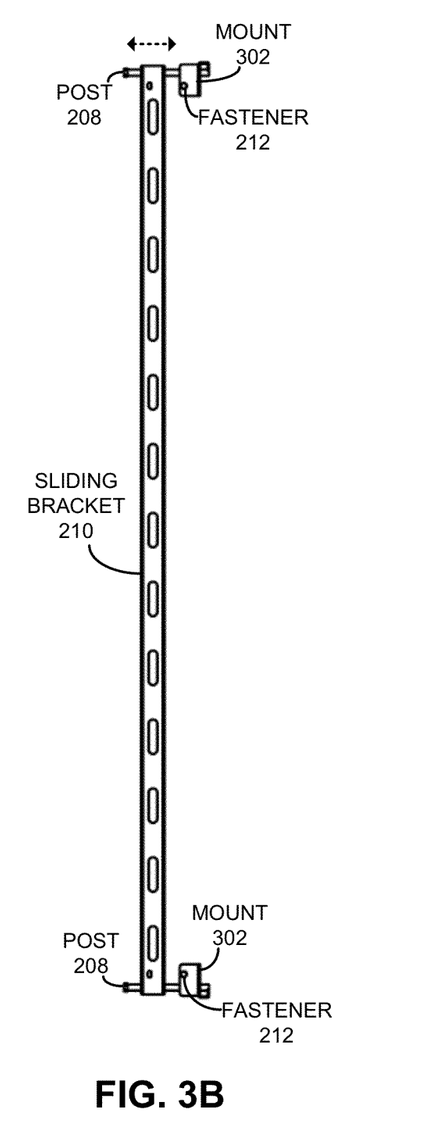
FIG. 3B presents a side view of the sliding bracket in accordance with the disclosed embodiments.
Figures 3C, 3D:
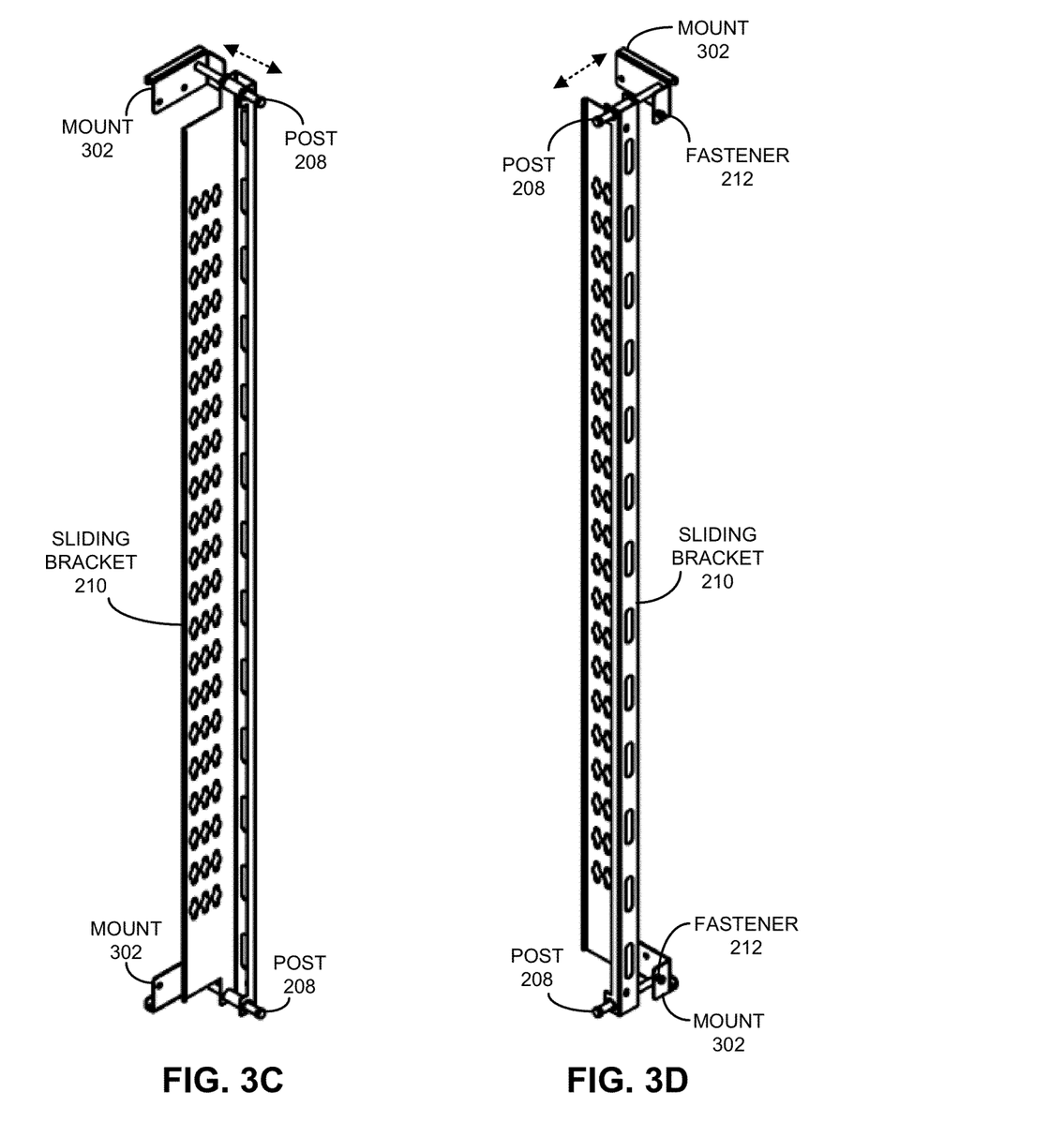
FIG. 3C presents an orthographic view of the sliding bracket in accordance with the disclosed embodiments.
FIG. 3D presents another orthographic view of the sliding bracket in accordance with the disclosed embodiments.
Figure 3E:
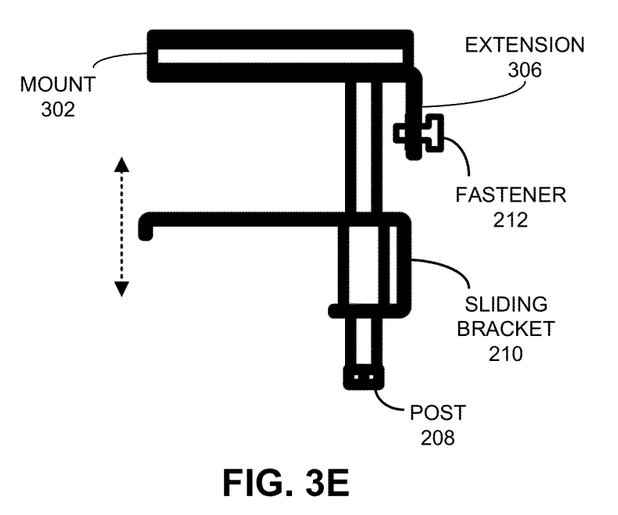
FIG. 3E presents a top view of the sliding bracket in accordance with the disclosed embodiments.

FIGS. 3A-3E present a number of views of sliding bracket 210 and associated mounting structures in accordance with the disclosed embodiments. More specifically, FIG. 3A presents a frontal view of sliding bracket 210, FIG. 3B presents a side view, FIG. 3C presents a first orthographic view, FIG. 3D presents a second orthographic view, and finally FIG. 3E presents a top view. Referring to FIG. 3A, note that sliding bracket 210 includes rows of holes 304 which can be used to mount PDU 204. Moreover, as mentioned above, sliding bracket 210 is mounted on two posts 208, one of which is connected to the top of sliding bracket 210, and the other of which is connected to the bottom of sliding bracket 210. In the embodiment illustrated in FIGS. 3A-3E, post 208 is affixed to a mount 302 which is attached to rack housing 101. Note that there are two such mounts 302, one of which is connected to the post 208 at the top of sliding bracket 210, and the other of which is connected to the post 208 at the bottom of sliding bracket 210.

As illustrated in FIG. 3E, mount 302 also includes an extension 306 that holds a fastener 212. Fastener 212 is configured to lock sliding bracket 210 in place when sliding bracket 210 is flush with mount 302. When sliding bracket 210 is locked in this position, the attached PDU 204 is in a normal-operating position.

Note that a large number of possible ways exist to fixedly attach a PDU to a rack housing to facilitate moving the PDU to perform system maintenance operations. In general, any type of movable mounting system or mechanical linkage can be used, and the disclosed embodiments are not meant to be limited to slidable mounting systems. For example, instead of the slidable mounting system, a hinged mounting system can be used.

Process of Replacing a Failed Inner PDU

Figure 4:
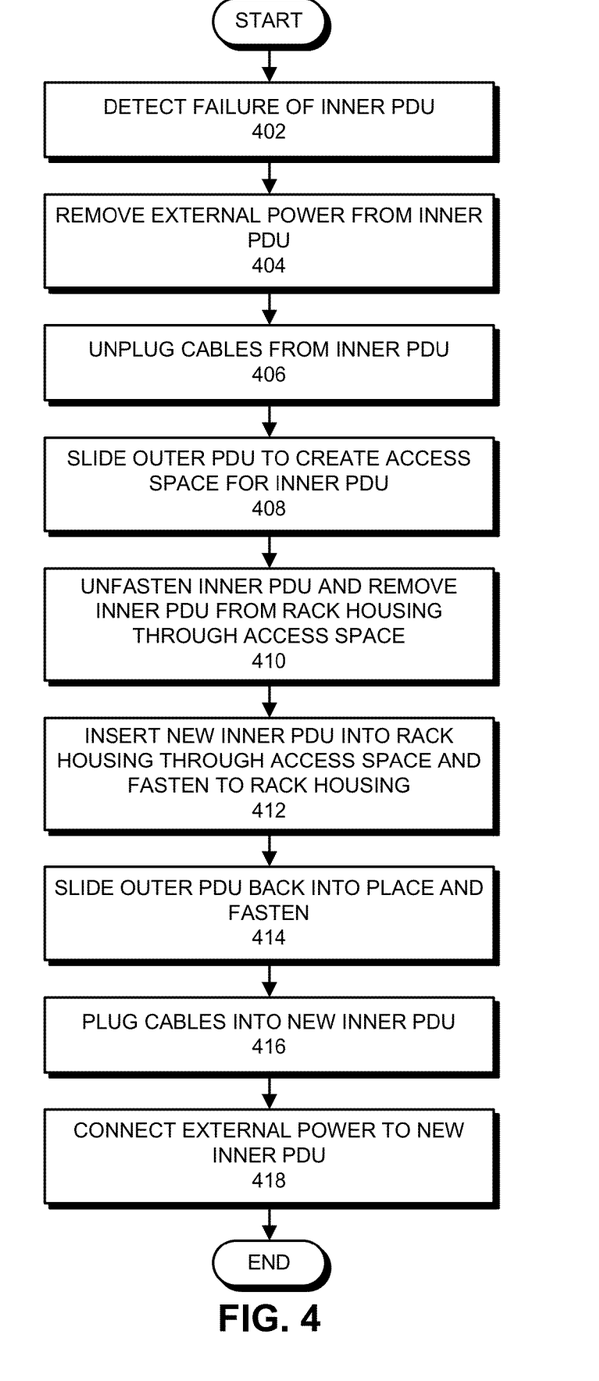
FIG. 4 presents a flow chart illustrating the process of replacing a failed inner PDU in accordance with the disclosed embodiments.

FIG. 4 presents a flow chart illustrating the process of replacing a failed inner PDU in accordance with the disclosed embodiments. Referring to the embodiment illustrated in FIGS. 2A and 2B, at the start of the process, the system detects a failure of the inner PDU 202 (step 402).

Next, in order to replace the failed inner PDU 202, external power is first removed from inner PDU 202 (step 404). Then, the power cables 216 that are used to supply power to components in rack 100 are unplugged from inner PDU 202 (step 406). Next, fastener 212 is unfastened, and outer PDU 204 is moved by sliding it along posts 208 to create an access space 206 for inner PDU 202 (step 408). (Note that power cables 216 can alternatively be unplugged after outer PDU 204 is moved.)

Inner PDU 202 is then unfastened from bracket 214 and is removed from rack housing 101 though access space 206 (step 410). Then, a new inner PDU 202 is inserted into rack housing 101 through access space 206 and is fastened to bracket 214 (step 412).

Outer PDU 204 is then moved back into place by sliding it along posts 208 and is fastened in place by fastener 212 (step 414). Next, power cables 216 are plugged into new inner PDU 202. (Note that power cables 216 can alternatively be plugged into new inner PDU 202 before outer PDU 204 is moved back into place.) Finally, external power is connected to new inner PDU 202 (step 418).

Extensions

The ability to move a PDU without having to power down the associated rack can be used to facilitate other system maintenance operations besides replacing a failed inner PDU. For example, the PDU can be moved to enable a service technician to "repair" a failed inner PDU instead of replacing the failed inner PDU. Also, the PDU can be moved to enable a service technician to access other system components and wires located behind the PDU. For example, the PDU can be moved to enable a service technician to replace a network cable located between the PDU and electronic components in the rack.

Also, the PDU can be moved in a number of different ways and is not meant to be limited to the sliding movement for the exemplary configuration illustrated in FIGS. 2A-2B. For example, the PDU can be attached to the rack housing a hinge, which allows the PDU to move in a swinging motion. Alternatively, the PDU can be attached to the rack housing through a mechanical linkage that allows the PDU to be moved translationally and/or rotationally to facilitate the maintenance operation.

Note that this translational movement can generally be in any direction: up, down, forward, backward, right or left. Similarly, the rotational movement can be clockwise or counter-clockwise around an axis that is oriented in any direction.

Alternatively, the PDU can be mounted to the rack housing in a manner which makes it easy to "completely disconnect" and move the PDU from its normal-operating position in the rack housing to create an access space without disconnecting the power cables that connect the PDU to the electronic components in the rack.

The PDUs can also be mounted in different locations and orientations within the rack housing. In the embodiments illustrated in FIGS. 1, 2A and 2B, the PDUs are mounted along the inside of the side panels of the rack housing, and the PDUs are oriented to run from the top to the bottom of the rack housing. However, in other embodiments, the PDUs can be mounted near the front or the back of the rack housing, or near the bottom or the top of the rack housing, as long as the power cables for the PDUs can reach the electronic components in the rack housing. The PDUs can also be oriented in any direction, top-to-bottom, side-to-side, or front-to-back, within the PDU (as long as the power cables can reach the electronic components).

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A rack for housing electronic components with a movable power distribution unit (PDU), comprising:
 a rack housing configured to accommodate a plurality of electronic components;
 a first PDU configured to supply electrical power to the plurality of electronic components;
 an attachment mechanism configured to slidably mount the first PDU to the rack housing so that the first PDU can slide to create an access space to facilitate a maintenance operation while the first PDU continues to supply power to the plurality of electronic components;
 a second PDU fixedly attached to the rack housing and also configured to supply power to the plurality of electrical components,
 wherein the second PDU is an inner PDU which is located closer to the plurality of electronic components than the first PDU;
 wherein when the first PDU is in a normal-operating position abutting to the rack housing, the first PDU restricts access to the second PDU; and
 wherein slidably moving the first PDU away from the normal-operating position creates the access space between the first PDU and the rack housing to facilitate a maintenance operation for the second PDU, wherein the second PDU remains fixedly attached to the rack housing while the first PDU slidably moves away from the rack housing to create the access space between the first PDU and the rack housing.

2. The rack of claim 1, wherein the access space created by moving the first PDU allows the second PDU to be replaced while the first PDU continues to supply power to the plurality of electronic components.

3. The rack of claim 1, wherein the attachment mechanism includes:
 a sliding bracket configured to attach to the first PDU; and
 a rail system connected to the sliding bracket, wherein the rail system enables the sliding bracket to slide to create the access space to facilitate the maintenance operation.

4. The rack of claim 1, wherein the attachment mechanism includes a fastener configured to fasten the first PDU in a normal-operating position.

5. The rack of claim 1, wherein the plurality of electronic components includes one or more of the following:
 server blades;
 networking components;
 storage devices; and
 telecommunications components.

6. The rack of claim 1, wherein the first PDU includes:
 electrical outlets for supplying power to the plurality of electronic components; and
 one or more circuit breakers for the electrical outlets.

7. A computer system including a rack for housing electronic components with a movable power distribution unit (PDU), comprising:
 a plurality of computer system components including one or more processors and a memory;
 a rack housing configured to accommodate the plurality of computer system components;
 a first PDU configured to supply electrical power to the plurality of computer system components;
 an attachment mechanism configured to slidably mount the first PDU to the rack housing so that the first PDU can slide to create an access space to facilitate a maintenance operation while the first PDU continues to supply power to the plurality of electronic components;
 a second PDU fixedly attached to the rack housing and also configured to supply power to the plurality of computer system components,
 wherein the second PDU is an inner PDU which is located closer to the plurality of computer system components than the first PDU;
 wherein when the first PDU is in a normal-operating position abutting to the rack housing, the first PDU restricts access to the second PDU; and
 wherein slidably moving the first PDU away from the normal-operating position creates the access space between the first PDU and the rack housing to facilitate a maintenance operation for the second PDU, wherein the second PDU remains fixedly attached to the rack housing while the first PDU slidably moves away from the rack housing to create the access space between the first PDU and the rack housing.

8. The computer system of claim 7, wherein the access space created by moving the first PDU allows the second PDU to be replaced while the first PDU continues to supply power to the plurality of computer system components.

9. The computer system of claim 7, wherein the attachment mechanism includes:
a sliding bracket configured to attach to the first PDU; and
a rail system connected to the sliding bracket, wherein the rail system enables the sliding bracket to slide to create the access space to facilitate the maintenance operation.

10. The computer system of claim 7, wherein the attachment mechanism includes a fastener configured to fasten the first PDU in a normal-operating position.

11. The computer system of claim 7, wherein the plurality of computer system components can include one or more of the following:
server blades;
storage devices; and
computer networking components.

12. The computer system of claim 7, wherein the first PDU includes:
electrical outlets for supplying power to the plurality of computer system components; and
one or more circuit breakers for the electrical outlets.

13. An apparatus that facilitates moving a power distribution unit (PDU) within a rack housing containing electronic components, comprising:
an attachment mechanism configured to slidably mount a first PDU to the rack housing so that the first PDU can slide to create an access space to facilitate a maintenance operation while the first PDU continues to supply power to a plurality of electronic components located within the rack housing;
wherein the rack is also attached to a second PDU that is fixedly attached to the rack housing and also configured to supply power to the plurality of electrical components;
wherein the second PDU is an inner PDU which is located closer to the plurality of electronic components than the first PDU;
wherein when the first PDU is in a normal-operating position abutting to the rack housing, the first PDU restricts access to the second PDU; and
wherein slidably moving the first PDU away from the normal-operating position creates the access space between the first PDU and the rack housing to facilitate a maintenance operation for the second PDU, wherein the second PDU remains fixedly attached to the rack housing while the first PDU slidably moves away from the rack housing to create the access space between the first PDU and the rack housing.

14. The apparatus of claim 13, wherein the access space created by moving the first PDU allows the second PDU to be replaced while the first PDU continues to supply power to the plurality of electronic components.

15. The apparatus of claim 13, wherein the attachment mechanism includes:
a sliding bracket configured to attach to the first PDU; and
a rail system connected to the sliding bracket, wherein the rail system enables the sliding bracket to slide to create the access space to facilitate the maintenance operation.

16. The apparatus of claim 13, wherein the attachment mechanism includes a fastener configured to fasten the first PDU in a normal-operating position.

17. The apparatus system of claim 13, wherein the plurality of electronic components includes one or more of the following:
server blades;
networking components;
storage devices; and
telecommunications components.

* * * * *